United States Patent

Lemke et al.

[11] 3,962,725
[45] June 8, 1976

[54] MAGNETIC-TAPE CARTRIDGE-LOADED PORTABLE VIDEO CAMERA USING PRERECORDED TIMING SIGNALS TO CONTROL THE VIDEO TIME BASE

[75] Inventors: James U. Lemke; Robert A. Lentz, both of Del Mar, Calif.

[73] Assignee: Eastman Kodak Company, Rochester, N.Y.

[22] Filed: Oct. 29, 1974

[21] Appl. No.: 519,178

[52] U.S. Cl. ................................. 360/36; 360/37; 360/33
[51] Int. Cl.² ...................... H04N 5/78; H04N 3/30
[58] Field of Search ............... 360/37, 31, 33, 70, 360/73, 36; 178/6, 7 A

[56] References Cited
UNITED STATES PATENTS

| | | | |
|---|---|---|---|
| 3,506,779 | 4/1970 | Brown | 178/6.6 B |
| 3,601,536 | 8/1971 | Calfee | 360/37 |
| 3,701,846 | 10/1972 | Zenzefilis | 360/37 |
| 3,711,640 | 1/1973 | Takano | 360/31 |

*Primary Examiner*—Bernard Konick
*Assistant Examiner*—Alan Faber
*Attorney, Agent, or Firm*—R. F. Cody

[57] ABSTRACT

A wholly self-contained video camera is disclosed as being cartridge-loaded with magnetic tape for picture taking. Sweep rates for the camera sensor are slaved to the tape drive of the camera; and little or no speed regulation is associated with the camera tape drive. The tape employed in the camera has a pre-recorded signal which is detected for sweep rate control purposes. Playback of video information recorded by the camera is accomplished by running the tape during playback at the "pre-record" speed.

12 Claims, 10 Drawing Figures

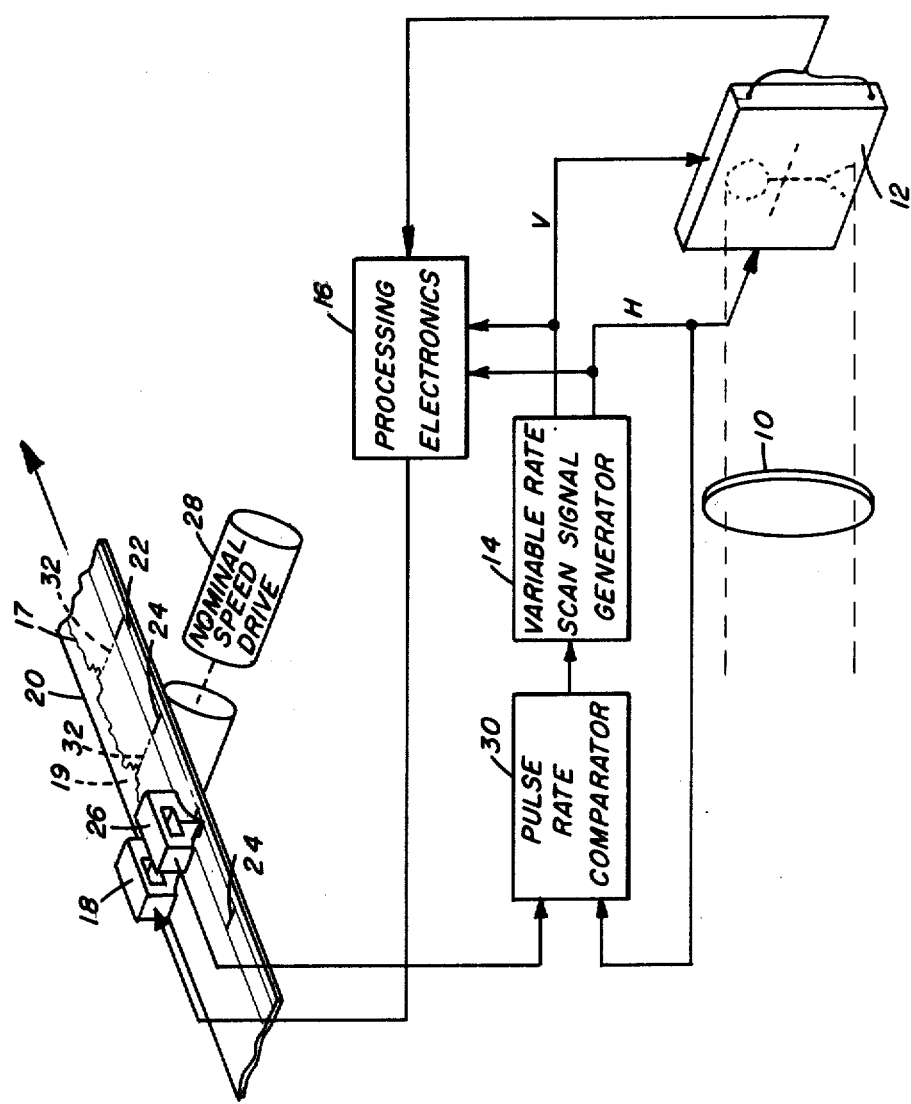

FIG. 2a ⌐²⁴   ⌐²⁴   ⌐²⁴   |

LINE A　LINE B　LINE C

FIG. 2d ⌐²⁴'　　⌐²⁴'　　⌐²⁴'

LINE A　LINE B　LINE C

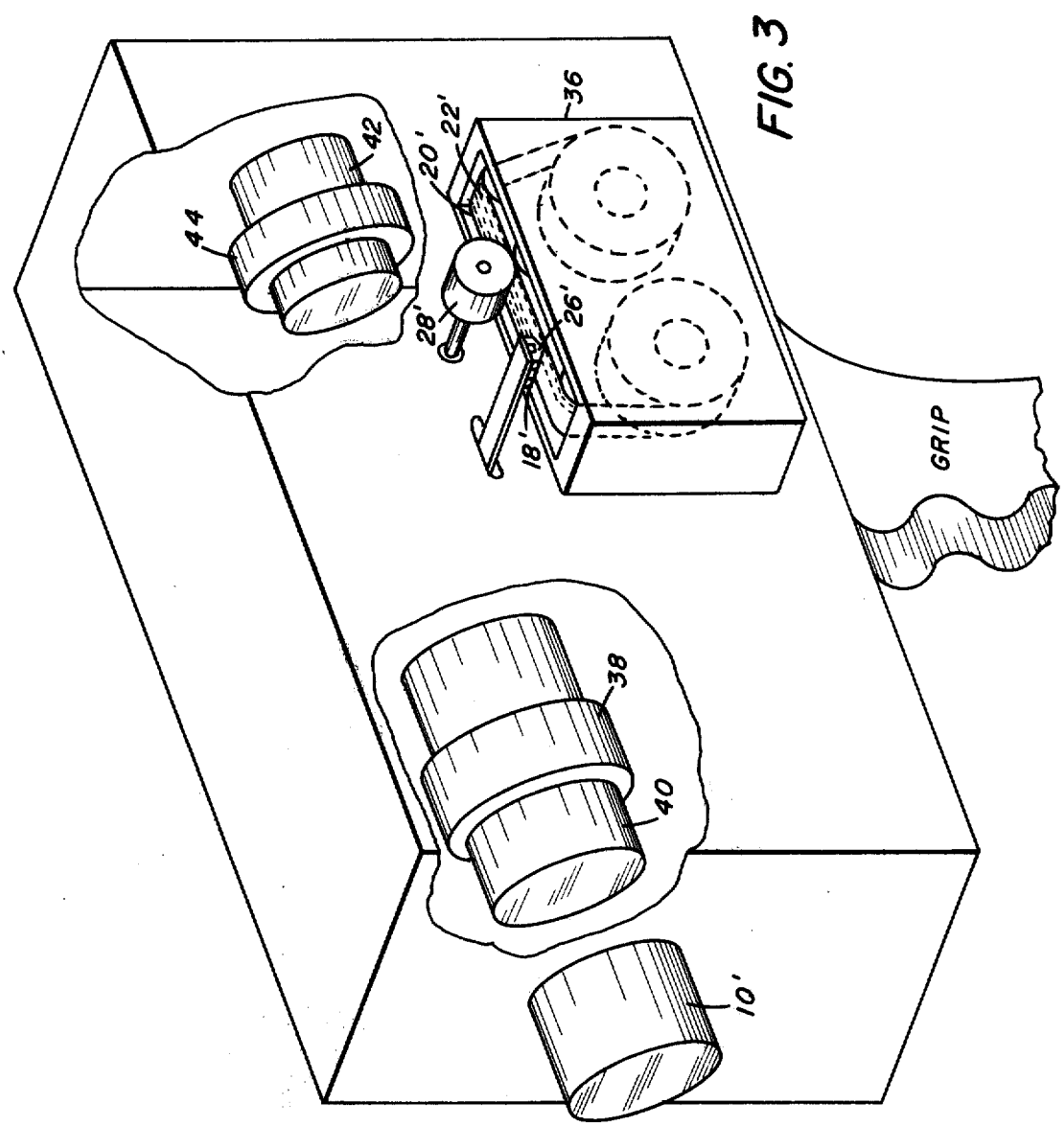

MAGNETIC-TAPE CARTRIDGE-LOADED PORTABLE VIDEO CAMERA USING PRERECORDED TIMING SIGNALS TO CONTROL THE VIDEO TIME BASE

BACKGROUND OF THE INVENTION

1. Field of the Invention

This invention relates in general to video signal processing and, more particularly, to apparatus and techniques which, by their adoption, facilitate the design and use of portable video cameras. The invention may be embodied in color video cameras, as well as in black-and-white video cameras.

2. Description Relative to the Prior Art

Aside from relatively large studio video cameras, various portable video cameras are beginning to appear in the trade. Such portable video cameras are characterized, usually, by a hand-held camera unit and a complementary unit which is usually worn as a back-pack, or the like, by the camera user. The hand-held camera unit serves as an image sensor; and the complementary 'back-pack' unit (1) serves as a recorder, (2) provides power for both the recorder and camera units, and (3) provides control signals for operating the camera unit and recorder. The actual image sensor of the camera unit, which sensor may, for example, be a vidicon, is operated at reference horizontal and vertical sweep frequencies; and the recorder, which typically is a video magnetic tape recorder, provides relatively precise speed control between its recording head(s) and tape. The precision tape-to-head(s) speed control is dictated by the magnetic tape playback function; i.e., in order to reconstruct, say on the face of a television picture tube, the video image seen by the sensor of the camera unit, it is necessary to replay the recorder tape at the same speed as was employed during the recording operation.

Video tape playback apparatus customarily drives magnetic tape at a precise predetermined speed. Thus, it has been incumbent, as in a portable video camera, for the video tape recorder thereof to control precisely its recording speed to the abovereferred to predetermined playback speed, for otherwise meaningful playback of camera-recorded images would be impossible. Requirements such as this have militated against the packaging of a video camera into a format resembling a conventional movie film camera. In other words, to embody a tape recorder having a precision tape drive — and all that entails — into a video camera is, almost by definition, akin to saying that the camera so produced is one that cannot be hand-held.

SUMMARY OF THE INVENTION

By use of the invention, a wholly self-contained hand-held magnetic-tape cartridge-loaded video camera has been implemented: Conceptually, the invention proposes departing from the prior art practice of using predetermined sweep rates for a camera image sensor and, instead, indicates the slaving of such sweep signals to pre-recorded precision tachometer, or tach, information on magnetic tape upon which video information seen by the sensor is to be recorded in correspondence with the pre-recorded information, the drive for such tape being adapted to run at a predetermined nominal speed. By such a technique, the recording speed of the tape — which in the prior art video camera art had to be precisely controlled — is free to wander relative to the nominal speed; yet, when the video information on the tape is played back on a precision playback unit adapted to run tape at precisely the nominal speed, the image information seen by the sensor is reconstructed. From the standpoint of the video camera user, therefore, the invention, in effect, substitutes a "weightless" pre-recorded track for that host of equipment which the user would otherwise have to carry, without sacrifice in system performance.

Although, as will appear below, the invention contemplates a preferred frequency associated with the occurrence of pre-recorded magnetic "marks", other associable frequencies are practicable with the invention. For example, a "pre-record" track could be produced by running a tape past a record head at precisely 20 inches per second (IPS), while pulsing such record head at precisely a 0.5 Mhz. rate. So long as the tape drive of the camera produces a nominal speed or 20 IPS, and the sweep rate of the camera is varied during picture-taking as a function of the tape drive-induced modulation experienced by the 0.5 Mhz. pre-recorded signal, then, when the video recorded by the camera is played back at precisely 20 IPS, the scenes recorded by the camera will be effectively reproduced. Or, the pre-record track could be produced by running tape past a record head at precisely 33.21 IPS, while pulsing the record head at precisely a .47 Mhz. rate. Then, so long as the camera has a nominal tape speed of 33.21 IPS, with accompanying sweep rates variable as a function of the drive-induced modulation of the .47 Mhz. pre-recorded track, playback at 33.21 IPS of the video recorded by the camera will be effective; etc.

In its presently preferred form, the invention employs a pre-recorded track formed by applying a signal of 15.75 Khz. while running tape past a record head at a nominal rate, for example, of precisely 60 IPS. By use of such a pre-recorded frequency, and accompanying variable sweep rates, each video line recorded by the camera, tape-driving at the nominal 60 IPS rate, is forced to lie precisely between a respective pair of successive pre-recorded marks of the 15.75 Khz. frequency. Attendantly, the sweep circuits of the camera can simply be set to run at NTSC standards, with one-to-one phase-comparison therein of the camera horizontal sweep circuit output with camera-playback of the pre-recorded 15.75 Khz. signal serving as the basic frequency control of the camera sweep circuits.

The invention will be described with reference to the figures, wherein:

FIG. 1 is a block diagram, partially schematic, illustrating apparatus embodying the general concepts of the invention;

FIGS. 2a through 2f are diagrams useful in describing the invention;

FIG. 3 is a perspective view, partially cut away, illustrating a self-contained portable video camera embodying the invention;

Figure 2B:

Referring to FIG. 1, the general arrangement of a camera according to the invention is depicted as having optics 10 for imaging scene information onto an image sensor 12. The sensor 12 as shown appears in the form of a solid state sensor such as a charge coupled device, although a vidicon or other sensor is equally as applicable to the invention. The video information appearing on the face of the sensor 12 is, conventionally, subject to periodic horizontal (H) and vertical (V) sweeping by a scan signal generator 14. As video information is gated, line-by-line, from the sensor 12, it is applied via processing electronics 16 to a record head 18. The processing electronics 16, in well-known fashion, inserts into the signal train output of the sensor 12 appropriate H and V video sync information, and otherwise defines the format for recording information on magnetic tape 20 by the camera record head 18. That is, the processing electronics 16 — depending, for example, on the arrangement of the machine which is adapted to play back the video recorded by the camera — modulates, or not, the sync-inserted video which it processes. Symbolically, the processed video 17 is depicted as occurring in a track 19 and as having an amplitude which falls width-wise of the tape.

The tape 20 is shown having a pre-recorded track 22 having magnetic marks 24 symbolically represented. The pre-recorded magnetic marks are equally spaced along the tape 20 and, when the tape 20 is driven at a precise predetermined nominal speed, the marks pass under a playback head 26 at a rate of 15.75 Khz. A tape speed drive 28, which may be energized, for example, by a battery or spring, and which may include suitable gearing, drives the tape at, or near to, the nominal speed. It is an important aspect of the invention that flutter of the tape 20, when driven by the drive 28, will have virtually no adverse effect on the recording capability of the camera. Thus, the tape drive 28 may be uncontrolled, or subject to relatively wide swings as it hunts, to the nominal speed (although, ideally, it would naturally be preferable if the tape were driven at precisely the nominal speed).

Playback of the pre-recorded track 22 causes "tape rate" signals to be applied to a comparator 30, to which the horizontal sweep rate signal H is also applied. The comparator 30 produces an error signal corresponding to the phase, and sense of, the difference between its two input signals; and such error signal is applied to increase and decrease the sweeping of the image sensor in proportion, respectively, to increases and decreases in the drive rate of the tape 20. As a result, the individual video line signals 17, as recorded by the head 18, are forced into a one-to-one side-by-side correspondence with the magnetic marks 24 of the pre-recorded track 22, dotted lines 32 of FIG. 1 reflecting such correspondence. This side-by-side correspondence of video line signals with magnetic marks, obviously, will occur so long as the scan signal generator will be able to track frequency-wise the magnetic marks which are received from the tape track 22.

Figure 2C:
Figure 2E:
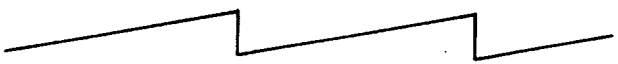
Figure 2F:

Reference should now be had to FIGS. 2a through 2f which serve to illustrate how the variable camera sweep rate concept of the invention produces reliable video camera picture-taking: FIG. 2a illustrates a train of pre-recorded magnetic mark signals 24 occurring at the 15.75 Khz. rate. FIG. 2b indicates a horizontal sweep signal of 15.75 Khz. FIG. 2c indicates the luminance information occurring in three successive pre-recorded lines a, b, c of a video scene; and X in FIG. 2c indicates a luminance level occurring at the exact center of the video line a, i.e., exactly centered between two successive pre-recorded signals 24. Assume, as in FIG. 2d, the camera tape drive slows, causing the pre-recorded signals (24') to occur at a rate less than 15.75 Khz. In accordance with the invention, this means that the sweep rate of a camera also slows (FIG. 2e); and attendantly, the luminance level (X') retains its exact center location between the two successive pre-recorded signals (24'): Irrespective of whether the tape drive of the camera is subject to speed variations, video signal information recorded by the camera will have a precise correspondence with the pre-recorded track 22 and, therefore, may be effectively played back on a playback machine adapted to run at a speed corresponding to the speed of the machine that produced the pre-recorded track 22 in the first place.

Reference should now be had to FIG. 3, which shows the general arrangement of a self-contained video camera made possible by means of the invention: A tape cassette 36, containing magnetic tape 20' having a pre-recorded track 22', is loaded into the camera by suitable means, not shown. As loaded, the tape engages a tape drive 28' which is disposed to pull the tape 20' past a pair of magnetic heads 18', 26'. The tape drive 28' is energized by means, not shown, to drive tape at approximately the recording speed which was employed when laying the track 22' on the tape. Signals produced by the head 26' as it reads the pre-recorded track 22' are applied to a circuit, as in FIG. 1, to vary the frequency of scan signals applied to the deflection apparatus 38 of, in this case, a vidicon 40. Optics 10' cooperate to image scene information onto the face of the vidicon 40; and the signal output of the vidicon 40 is appropriately processed, as in FIG. 1, and then applied to the recording head 18' of the camera.

In addition to being applied to the record head 18', the processed video signal output of the vidicon 40 is also applied to control the Z-axis of a monitor cathode ray tube (CRT) 42. Those variable scan frequency signals which are applied to the deflection apparatus 38 of the vidicon 40 are also applied to the deflection apparatus 44 of the monitor CRT 42. Thus, as will be more apparent from the discussion below in connection with FIG. 4, the monitor CRT 42 sees at the instant of picture-taking what the image that corresponds to the recorded video information 20' really looks like. As such, the monitor CRT 42 serves both to monitor the recording process and as a viewfinder for the camera.

Figure 4:
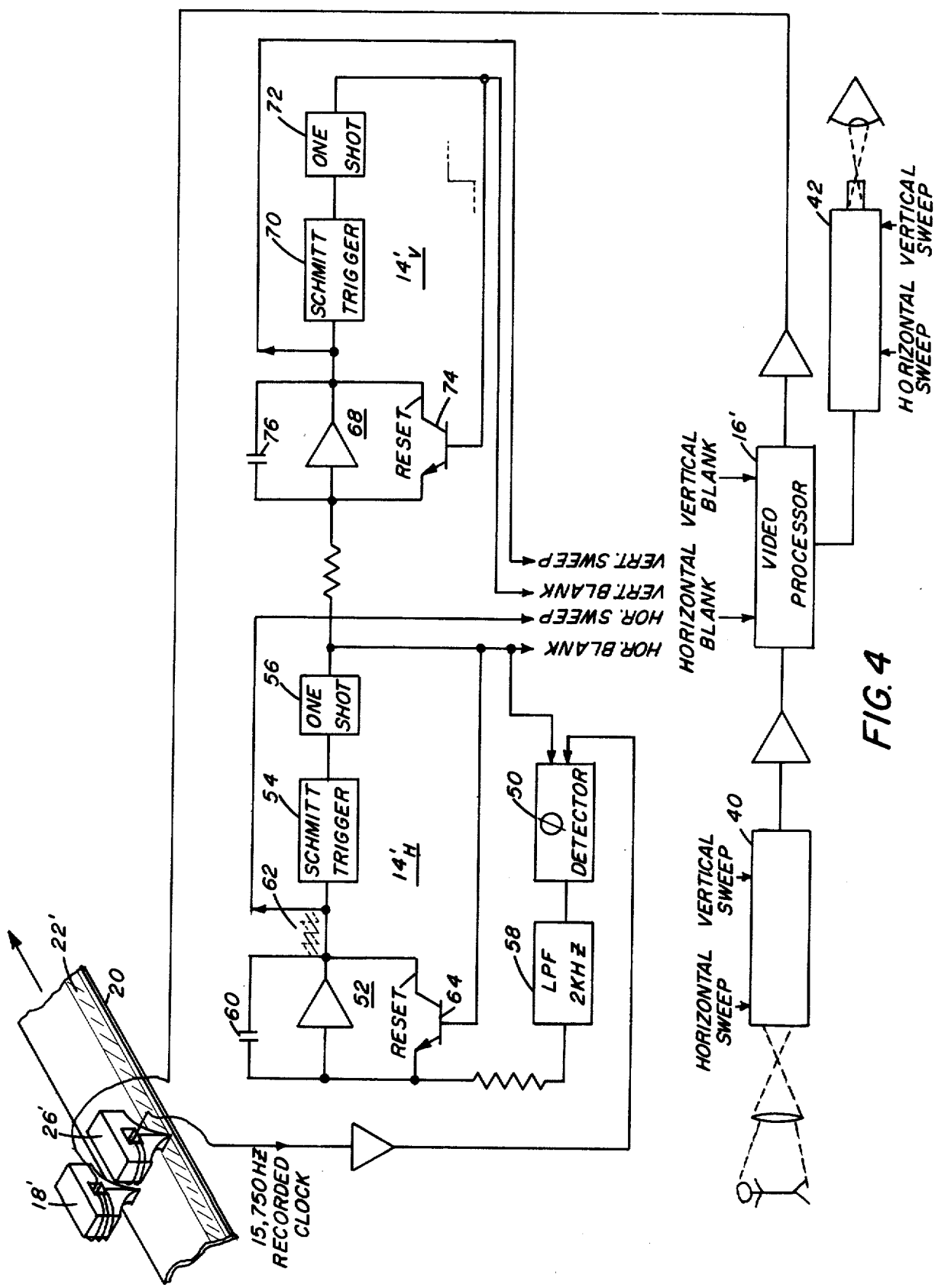
FIG. 4 is a schematic diagram illustrating an embodiment of the invention according to a presently preferred form thereof.

Turning now to FIG. 4, the presently preferred form of the invention is shown employing a phase detector 50 as the basic control for the sweep signals applied to the vidicon 40 and monitor CRT 42. The phase detector 50 is adapted to compare the phase of playback signals derived, by the head 26', from the pre-recorded track 22' with signals which correspond to those produced by a horizontal sweep signal generator $14'_H$. The sweep signal generator $14'_H$ includes a Miller integrator sawtooth generator 52 which is adapted to produce a horizontal sweep signal having a "nominal" frequency. The sawtooth output of the circuit 52, aside from being applied to the horizontal deflection circuits of the vidicon 40 and monitor 42, is applied to a Schmitt trigger circuit 54 which drives a one-shot circuit 56. The one-shot output, which is in sync with the sawtooth signal output of the circuit 52, is phase-compared with the played-back signals of the track 22', thereby to produce an error signal at the output of the phase detector 50. The error signal output of the phase detector 50 is applied via a 2 Khz. low-pass filter 58 to vary the charge rate of the capacitor 60 in the Miller integrator circuit 52 (see the waveform outputs 62 which reflect this charge rate variability), and such charge rate variability causes the reset transistor 64 of the circuit 52, in response to the one-shot 56 output, to turn on, with appropriate periodic variability, to force the horizontal sweep signal output of the circuit 52 to keep in time with the playback of signals from the pre-recorded track 22.

A low-pass filter (58) is employed in connection with the phase detector 50 output for the reason that, as a practical matter, the principal troublesome frequency range of flutter, at least from the standpoint of playback through a typical commercial television set, is in the frequency range below 2 Khz.

The vertical sweep circuit $14'_V$ is substantially the same as the horizontal sweep circuit $14'_H$ and comprises a Miller integrator sawtooth generator 68, a Schmitt trigger 70, and a one-shot 72, the one-shot serving to turn on a transistor 74 to reset the integrator 68. Of course, the "nominal" charge time of the capacitor 76 of the integrator 68 is longer than the "nominal" charge time of the capacitor 60, but it is important to note that the vertical sweep circuit $14'_V$ output is slaved to the horizontal sweep circuit $14'_H$ output. Thus, the vertical sweep of the vidicon 40, as well as the horizontal sweep thereof, reflects any variability in the nominal speed of the tape.

For convenience, the outputs of the one-shots 56, 72 may be applied to a conventional video processor circuit 16' (which may suitably modulate the video signal output of the vidicon) thereby to insert the blanking and sync signal information into the vidicon signal output prior to the recording of such output on the tape 20' by the camera record head 18'.

In its presently preferred form, the output of the camera playback head 26' (and, attendantly, that of the sweep circuit $14'_H$ also) has a frequency of 15.75 Khz. when the tape 20' is run precisely at "nominal" speed. Thus, the camera of FIG. 4 works like that of FIG. 1, with the camera-recorded video having a side-by-side correspondence with the pre-recorded track as indicated by character 32 of FIG. 1.

Figure 5:
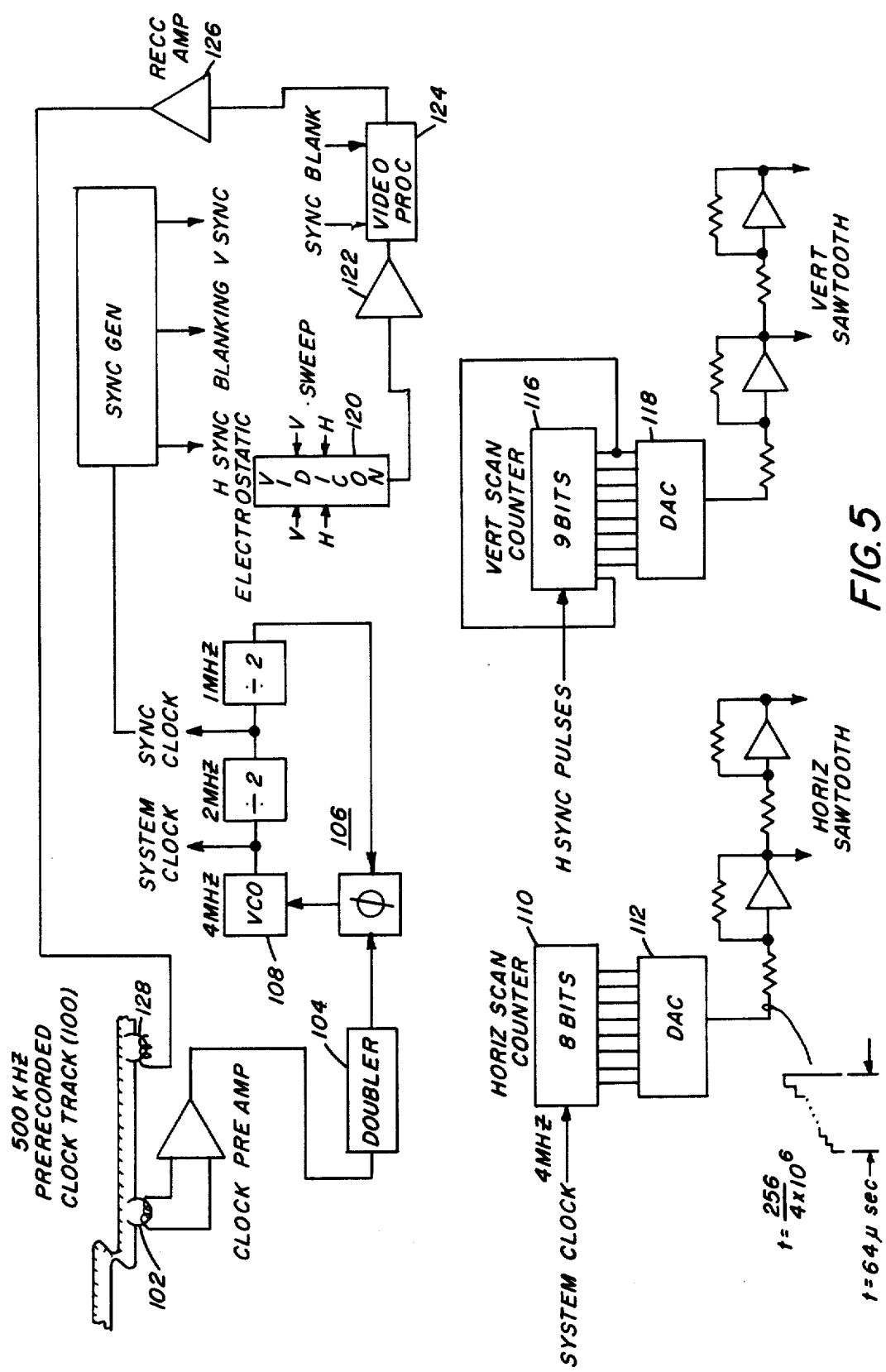
FIG. 5 is a schematic diagram illustrating another embodiment of the invention.

It is indicated above that the frequencies of the pre-recorded signal information, while preferably at 15.75 Khz., can have any of a variety of frequencies for a given nominal tape speed. FIG. 5 is presented at this time to show another embodiment of the invention wherein the pre-recorded track produces a signal frequency of 500 Khz. at the nominal camera-record speed:

Referring to FIG. 5, the clock track 100 is read by the playback head 102 and is preamplified and fed to a doubler 104. The 1 Mhz. doubler signal is fed to the comparison input of a phase lock loop 106. The voltage controlled oscillator (VCO) 108 of the phase lock loop operates at 4 Mhz. and is counted down in two steps to 1 Mhz. The 1 Mhz. signal is, therefore, locked to the incoming 500 Khz. clock via the comparison circuit of the phase lock loop 106; and so too are the 4 Mhz. and 2 Mhz. signals.

The 4 Mhz. system clock is fed to an 8 bit binary counter 110 whose outputs are connected to an 8 bit digital-to-analog converter 112 (DAC). The 8 bit counter 110 cycles through 256 steps every 64 $\mu$ seconds, thereby causing the output of the DAC 112 to be a stairstep waveform, one H line long. The stairstep is filtered, resulting in a horizontal sawtooth which is the horizontal sweep.

The 2 Mhz. sync clock is fed to a sync generator chip 114 of any well-known form, thereby causing the H sync, the H blank, the V sync, and the V blank pulses to be generated.

The H sync pulses are counted in a 9 bit counter 116 which feeds a 9 bit DAC 118. The most significant bit of the counter 116 is applied to the least significant input of the DAC 118. The 8 lesser bits of the counter 116 generate 256 lines, and the 9th bit position, applied to the DAC least significant input, generates a "fixed interlace" vertical staircase output. In the present embodiment, a 512-line, rather than a 525-line, interlace is described. This is for convenience only; a full NTSC compatible system would use the appropriate counting devices. The vertical DAC 118 output staircase is filtered, and the sawtooth so produced is used as the vertical sweep.

As was the case in connection with FIG. 4, it should be noted that both the horizontal and vertical sweeps, and the control pulses, are all locked to the tape clock.

The optical image which is focused on the surface of the vidicon 120 is electrostatically swept by the H and V sawtooth signals, the vidicon output being amplified (122) and processed to include H and V sync pulses (124) which are inserted into the video signal in a standard manner. The composite video signal output of the processor 124 is fed to a record amplifier 126 which, in cooperation with a record head 128, records the composite video signal on the tape adjacent to the clock track 100.

Since all video timing is tied back to the clock track 100 on the tape, it can be seen that each horizontal picture element is in a unique one-to-one correspondence with a signal derivable from the clock track.

The invention has been described in detail with particular reference to preferred embodiments thereof, but it will be understood that variations and modifications can be effected within the spirit and scope of the invention.

What is claimed is:

1. A method of recording and playing back video information on magnetic tape comprising:
    a. first recording along the length of said magnetic tape timing signal information while moving said tape at a precise nominal speed;
    b. thereafter moving said tape at approximately said nominal speed past a record head;
    c. applying video signals to said record head while varying the time base of said video signals as a function of variations in tape speed relative to said precise nominal speed; and
    d. thereafter moving said tape at precisely said nominal speed while playing back said video signals recorded by said record head.

2. Video camera recording apparatus comprising:
    a. an image sensor for producing signals representative of images sensed by said sensor;
    b. means for producing and applying sweep signals to said sensor for deriving from said sensor said image representative signals;
    c. a web for recording said image representative signals, said web having therealong pre-recorded signals which correspond to a precise nominal speed for said web;
    d. means for recording said image representative signals on said web;
    e. means for driving said web past said recording means; and
    f. means responsive to said pre-recorded signals and cooperative with said means for producing sweep signals for so modifying said sweep signals that increases and decreases in the speed of said web with respect to said nominal speed effect, respectively, corresponding increases and decreases in said sensor sweep rates.

3. The camera of claim 2 wherein either the frequency of said pre-recorded signals or the nominal frequency of said sweep signals is a whole number multiple of the other.

4. The camera of claim 2, including:
   a. a monitor cathode ray tube;
   b. means for mounting said monitor cathode ray tube for viewing while picture taking;
   c. means for applying said variable sweep rate signals to said monitor simultaneously with their application to said sensor; and
   d. means for applying said image-representative signals to said monitor cathode ray tube to intensity modulate the beam of said monitor cathode ray tube while simultaneously recording said image-representative signals on said web.

5. Video camera apparatus for recording video signal information on magnetic tape, said tape having thereon pre-recorded control signal information comprising:
   a. an image sensor adapted for line-by-line scanning thereof;
   b. means for effecting scanning of said image sensor;
   c. video signal recording head means responsive to the output of said image sensor and adapted to apply said image sensor output to said tape;
   d. playback head means for producing signals corresponding to said pre-recorded control signal information on said tape;
   e. means for moving said tape past said video signal recording head means at approximately a nominal speed; and
   f. means responsive to signals produced by said playback head means and cooperative with said means for effecting scanning of said image sensor for varying the rate of said scanning to compensate for variations in said tape speed relative to said nominal speed.

6. The camera apparatus of claim 5 wherein either said pre-recorded control signal information or said signals for effecting image sensor scanning is a whole number multiple of the other.

7. The camera apparatus of claim 5, including a monitor supported by said camera apparatus for viewing during picture-recording, said monitor being adapted to receive said image sensor output and display images corresponding to said sensor output in synchronism with the application of said sensor output to said tape.

8. A video camera adapted to be loaded with magnetic tape having pre-recorded timing signals along the length of said tape, said camera having first and second magnetic heads, respectively, for playback of said pre-recorded timing signals and for recording video signal information on said tape, said camera further comprising:
   a. an image sensor;
   b. means cooperative with said sensor for scanning said sensor at a variable rate to produce video signals corresponding to the image information appearing on said sensor;
   c. means for applying said video signals to said second magnetic head;
   d. means for moving said tape relative to said first and second magnetic heads;
   e. means for producing signals corresponding to the scan rate of said sensor;
   f. means for effecting a rate comparison between said timing signals and said signals corresponding to said scan rate to produce a control error signal; and
   g. means for applying said error signal to said means for scanning said sensor at a variable rate to vary said scanning rate to cancel said error signal.

9. The camera of claim 8 wherein the timing signals are pre-recorded at a frequency of approximately 15,750 Hz., and wherein said means for scanning said sensor is adapted to operate at a nominal scan rate of approximately 15,750 Hz.

10. The camera of claim 8, including a cathode ray tube monitor supported for viewing while picture-taking, means for synchronously operating the sweep circuit of said monitor with the scanning of said sensor, and means for applying said video signals to said monitor while simultaneously applying said signals to said second magnetic head.

11. A video camera adapted to be loaded with magnetic tape which has been pre-recorded with timing signals along the length of said tape, comprising:
   a. an image sensor;
   b. means for horizontally scanning said sensor;
   c. means for vertically scanning said sensor;
   d. a playback head responsive to said pre-recorded signals;
   e. a record head responsive to the video signal output of said sensor and adapted to lay said signal output along the length of said magnetic tape;
   f. means having a nominal speed for moving said tape past said playback and record heads; and
   g. means responsive to the output of said playback head for so regulating the scanning rates of said means for horizontally and vertically scanning said sensor that time base correspondence is maintained between said pre-recorded timing signals and said video signals recorded on said tape by said record head.

12. The camera apparatus of claim 11 including means for so coupling said means for vertically scanning said sensor to said means for horizontally scanning said sensor that operation of said vertical scanning means is responsive to a predetermined number of cycles of said horizontal scanning means, and wherein said means for regulating scanning rates is adapted to regulate directly only the horizontal scanning of said sensor.

* * * * *

UNITED STATES PATENT AND TRADEMARK OFFICE
CERTIFICATE OF CORRECTION

PATENT NO. : 3,962,725
DATED : June 8, 1976
INVENTOR(S) : James U. Lemke and Robert A. Lentz It is certified that error appears in the above-identified patent and that said Letters Patent are hereby corrected as shown below:

In the heading, the assignee is erroneously given as "Eastman Kodak Company". It should read -- Eastman Technology, Inc. --.

Signed and Sealed this

Seventeenth Day of May 1977

[SEAL]

Attest:

RUTH C. MASON
Attesting Officer

C. MARSHALL DANN
Commissioner of Patents and Trademarks